US010521376B1

United States Patent
Mitra et al.

(10) Patent No.: US 10,521,376 B1
(45) Date of Patent: Dec. 31, 2019

(54) ENCLOSURE MANAGEMENT OVER PCIE

(71) Applicant: Seagate Technology LLC, Cupertino, CA (US)

(72) Inventors: Sumanranjan Mitra, Mumbai (IN); Ajit Patil, Bangalore (IN); Sivaprakash Rajaram, Madurai (IN)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/922,691

(22) Filed: Mar. 15, 2018

(51) Int. Cl.

| | |
|---|---|
| ***G06F 13/28*** | (2006.01) |
| ***G06F 13/42*** | (2006.01) |
| ***G06F 11/30*** | (2006.01) |
| ***G06F 3/06*** | (2006.01) |

(52) U.S. Cl.
CPC ............ *G06F 13/28* (2013.01); *G06F 3/0604* (2013.01); *G06F 3/0655* (2013.01); *G06F 3/0664* (2013.01); *G06F 3/0683* (2013.01); *G06F 11/3034* (2013.01); *G06F 13/4221* (2013.01); *G06F 2213/0026* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,484,084 | B1 * | 1/2009 | Ranaweera | G06F 8/656 713/1 |
| 9,043,527 | B2 | 5/2015 | Bhatia et al. | |
| 9,615,485 | B1 | 4/2017 | Pitwon et al. | |
| 2012/0042307 | A1 * | 2/2012 | Shao | G06F 8/654 717/168 |
| 2017/0180216 | A1 * | 6/2017 | Peng | H04L 41/24 |
| 2017/0344294 | A1 * | 11/2017 | Mishra | G06F 3/0622 |
| 2018/0032462 | A1 * | 2/2018 | Olarig | G06F 13/4022 |
| 2018/0074984 | A1 * | 3/2018 | Olarig | G06F 13/36 |
| 2018/0285019 | A1 * | 10/2018 | Olarig | G06F 3/0655 |

OTHER PUBLICATIONS

Richard Solomon, "PCI Express Basics and Background", PCI Express, PCIe Technology Seminar, 2014, US, 45 pages.
Wikipedia, "Intelligent Platform Management Interface", US, 7 pages, edited Jan. 18, 2018, retrieved Feb. 20, 2018.https://en.wikipedia.org/w/index.php?title=Intelligent_Platform_Management_Interface&oldid=821106028.
Xillybus, "Down to the TLP: How PCI express devices talk (Part I)", IP Cares and Design Services, Retrieved Feb. 20, 2018, US, 6 pages.http://xillybus.com/tutorials/pci-express-tlp-pcie-primer-tutorial-guide-1.

* cited by examiner

*Primary Examiner* — Raymond N Phan
(74) *Attorney, Agent, or Firm* — Setter Roche LLP; Christian W. Best

(57) ABSTRACT

An apparatus may include a baseboard management controller (BMC) configured to monitor one or more statuses of a storage array enclosure of the BMC. The BMC may further communicate with a host device of a PCIe network topology via a PCIe port of the BMC including performing a direct memory access (DMA) write to store status information of the enclosure to a memory of the host device via the PCIe network topology and performing a DMA read to retrieve control information from the memory of the host device via the PCIe network topology. In addition, the BMC may control one or more devices of the storage array enclosure based on the retrieved control information.

20 Claims, 7 Drawing Sheets

100
Host 102
Interconnect 118
Switch 106
120
122
124
126
128
DSD 110
DSD 112
DSD 114
DSD 116
Fan 130
Temp 132
CPLD 134
BMC 108
Enclosure 104

ENCLOSURE MANAGEMENT OVER PCIE

SUMMARY

In some embodiments, an apparatus may include a baseboard management controller (BMC) configured to monitor one or more statuses of a storage array enclosure of the BMC. The BMC may further communicate with a host device of a PCIe network topology via a PCIe port of the BMC including performing a direct memory access (DMA) write to store status information of the enclosure to a memory of the host device via the PCIe network topology and performing a DMA read to retrieve control information from the memory of the host device via the PCIe network topology. In addition, the BMC may control one or more devices of the storage array enclosure based on the retrieved control information.

In some embodiments, an apparatus may include a baseboard management controller (BMC) configured to monitor one or more statuses of a storage array enclosure of the BMC. The BMC may further communicate with a first host device of a first PCIe network topology via a first PCIe port of the BMC including sending first status information of one or more first storage devices of the storage array enclosure that are part of the first PCIe network topology to the first host device via the first PCIe network topology. In addition, the BMC may communicate with a second host device of a second PCIe network topology via a second PCIe port of the BMC including sending second status information of one or more second storage devices of the storage array enclosure that are part of the second PCIe network topology to the second host device via the second PCIe network topology.

In some embodiments, an apparatus may include a baseboard management controller (BMC) configured to receive enclosure virtualization configuration information indicating one or more first storage devices of the storage array enclosure that are to be part of a first PCIe network topology of a first host device and one or more second storage devices of the storage array enclosure are to be part of a second PCIe network topology of a second host device. Then, based on the enclosure virtualization configuration information, the BMC may cause one or more first responses to a first enumeration operation from the first host device to allow the first enumeration operation to include the one or more first storage devices in the first PCIe topology and cause one or more second responses to a second enumeration operation from the second host device to prevent the second enumeration operation from including the one or more first storage devices in the second PCIe topology.

DETAILED DESCRIPTION

Figure 1:
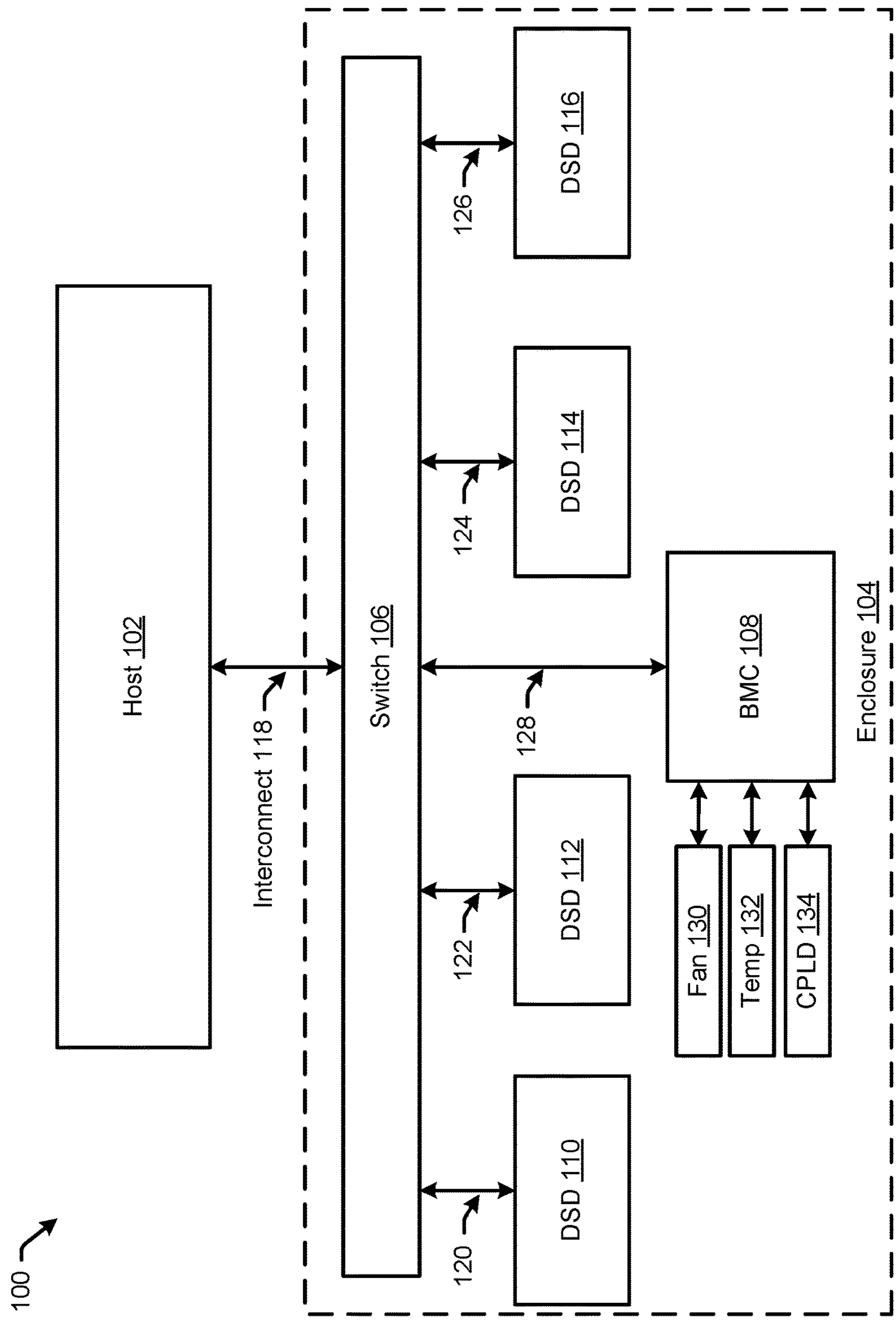
FIG. 1 is a block diagram of a system including enclosure management communications being performed via a PCIe network topology through which the PCIe host device communicates with endpoint data storage devices of the enclosure, in accordance with certain embodiments of the present disclosure.

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, dedicated hardware implementations including, but not limited to, application specific integrated circuits, programmable logic arrays, and other hardware devices can be constructed to implement the methods and functions described herein. Further, the methods and functions described herein may be implemented as a device, such as a memory device, including instructions that when executed cause a processor to perform the methods.

The present disclosure generally relates to enclosure management in systems using Peripheral Component Interconnect Express (PCIe) protocol and PCIe devices or similar protocols and devices, and in some embodiments, the present disclosure relates to enabling enclosure management communications to be performed via the PCIe network topology through which the host device may communicate with endpoint data storage devices.

Some implementations of the technology described herein include an enclosure management controller dynamically monitoring various parameters within the enclosure. A host device may dynamically receive the monitored parameters from the enclosure management controller, analyze the received parameters, and provide feedback to the enclosure management controller based on the analysis results to control the enclosure.

Various components may be monitored and controlled in enclosures (e.g., data storage arrays, storage servers, top of rack switches and converged platforms) and the parameters monitored or controlled may include temperature, cooling fan speeds, power status, operating system (OS) status, etc.

For example, many components may generate heat within the enclosures, which can have negative effects on a computing system. Some implementations may include an enclosure comprising of 80 or 90 disk drives generating heat. If not regulated, such heat may lead to system failure. Many enclosures may include mechanical devices that may assist in regulating the heat generated in the enclosures. In some enclosures, the enclosure components can be cooled by fans. However, the power consumption of fans may represent a substantial percentage of overall power consumption in the enclosure. Also, fans can have mechanical problems, such as dust accumulation or bearing degradation, which can lead to overheating and failure of a system.

As mentioned above, present disclosure relates to enabling enclosure management communications to be performed via the PCIe network topology through which a host device may communicate with endpoint data storage devices of the enclosure. As such, certain embodiments of the present disclosure include systems and methods that relay heat data and cooling control information between an enclosure management controller (e.g. a baseboard management controller (BMC)) and the host device.

In another example, a parameter monitored and controlled may be drive power status. In some implementations, the enclosure management controller may provide drive status information to a host device. The host device may analyze the drive status information and provide control information to the enclosure management controller to turn the drives on and off. In yet another example, drive status information may include information such as whether a drive is connected in a drive slot, a drive slot temperature and so on. If the drive status information indicates a drive is connected in a drive slot and that the drive slot temperature has increased beyond a threshold point, the host device may provide control information to cause the enclosure to increase the associated fan speed.

In some implementations, the disclosed systems and methods may provide for hot plugging of enclosures to a host's PCIe network topology such that the enclosure management controller and related functionality become active without significant interruption to the operation of the system.

In some implementations, the disclosed systems and methods may provide for enclosure management communications to be performed using DMA writes and accesses to and from the host's memory using the PCIe protocol, respectively.

In some implementations, the disclosed systems and methods may provide for enclosure virtualization between multiple host devices. In some examples of enclosure virtualization, an enclosure management controller may give status information for and allow control by a host device over those enclosure components that are in its PCIe topology. In some examples, an administrator may assign permissions to the host devices such that the assigned portions of the enclosure become part of the assigned host device's topology. In some examples of enclosure virtualization, the enclosure management controller (e.g. BMC) may include multiple PCIe ports, each of which may be used for a different host's PCIe topology. In some examples, the number of PCIe ports included on the BMC may match the number of virtual partitions the PCIe switch of the enclosure allows. In some embodiments, the PCIe switch may allow numbers of virtual partitions on the order of 8, 16, 32, 64, etc. As mentioned above, this may allow each host connected the switch to see a respective BMC instance in its PCIe topology.

The systems and methods disclosed herein may have applications in data centers, optically interconnected exascale data center architectures, corresponding cloud infrastructures, etc.

As mentioned above, some examples herein may be implemented using the Peripheral Component Interconnect Express (PCIe) protocol and PCIe devices. PCIe is a packet switched network. In general, a PCI Express network or fabric may include three types of devices: the root complex, switches, and endpoints. The root complex is generally associated with or part of a host processor or controller of the PCIe network. The root complex (which may be used interchangeably herein with the host processor or controller) may be responsible for configuring the PCIe network at power-up. Since PCIe connections are point to point, switches may be used to expand the network. PCIe endpoints may be devices other than the host or root complex and switches. For example, endpoints may be I/O devices in the network (e.g. the sources of, and destinations for the data). In some implementation herein, the PCIe endpoints may include data storage devices.

PCIe networks may route data based on memory address or IDs, depending on the transaction type. As such, each device may be uniquely identified within the PCI Express network. This may require a process called enumeration. When additional devices are added to the PCI Express network, the root or host may re-perform enumeration to add the additional devices to the PCIe topology.

Within a PCIe network (or topology), all devices may share the same address space. During initialization of the PCIe network, the root complex of the host may perform the enumeration process to determine the various buses that exist and the devices that reside on each bus, as well as the address space. The root complex may allocate bus numbers to the PCIe buses and configure the bus numbers to be used by the PCIe switches. The root complex may also set up the Base Address Registers (BAR) of each device.

The PCIe protocol includes bus mastering which may allow an endpoint to access a host's memory directly (e.g. DMA). Implementations according to this disclosure using PCIe protocol may utilize bus mastering to allow the enclosure management controller to post status information or data directly to the host's memory and retrieve control commands directly from the host's memory. This may reduce overhead by avoiding the need for request-completion type interactions seen in some other systems. For example, this may offload the need for the host processor to dedicate processing bandwidth to read and write status and control data from and to the BMC.

Some example implementations may also provide for communicating using SCSI Enclosure Services (SES) message format within PCIe communications.

Although the examples herein may be illustrated and described in the context of the PCIe protocol and devices, this is merely for ease of discussion. Further, embodiments of the disclosed subject matter are not limited to this context. For example, the techniques and systems disclosed may be used with any protocols similar to or which provide similar functionality to those of the PCIe protocol.

Referring to FIG. 1, a block diagram of a system that includes enclosure management communications being performed via a PCIe network topology through which the PCIe host device communicates with endpoint data storage devices of the enclosure is shown and is generally designated 100.

The components of system 100 may include a host device and one or more devices connect to the host device. In some embodiments, these devices may communicate using Peripheral Component Interconnect Express (PCIe) standard or a similar protocol. More particularly, the system 100 includes a host device 102 and an enclosure 104. The enclosure 104 may include a switch 106, a baseboard management controller 108, data storage devices (DSDs) 110-116, a fan 130, a temperature sensor 132 and a complex programmable logic device (CPLD) 134. The host device 102 may be coupled to the enclosure 104 by an interconnect 118 that may interface with the switch 106. Switch 106 may be coupled to the BMC 108 via interconnect 128 and to the DSDs 110-116 via interconnects 120-126, respectively. Each of the interconnects 118-128 may be PCIe interconnects and may couple items 102 and 106-116 to form the PCIe network topology of the host device 102. The BMC 108 may be connected to the fan 130, the temperature sensor 132 and the CPLD 134. The connections between the BMC 108 and items 130-134 may be PCIe interconnects or various other communications interfaces.

The host device 102 may be any type of host such as a processor of an individual computer, a host processor in a data center or so on. The DSDs 110-116 may be any type of data storage device connected to the host (e.g. via a PCIe network). In some examples, the DSDs may be NVM Express (NVMe) devices. The switch 106 may be any type of PCIe switch or similar device. The interconnects 118-128 may be PCIe links, other connections or fabric. A PCIe link may refer to a point-to-point communication channel between two PCI Express ports. At the physical level, a link is composed of one or more lanes. Together, the switch 106 and interconnects 118-128 may comprise a PCIe fabric or network.

As shown in FIG. 1, the host device 102 may perform various operations to store data to and retrieve data from the DSDs 110-116 via the PCIe topology. The host device 102 may also operate as the root of the PCIe topology. The BMC 108 may operate to collect status information from one or more of the switch 106, the DSDs 110-116, the fan 130, the temperature sensor 132 and the CPLD 134. This status information may be supplied to the host device 102 via the PCIe topology. The host device 102 may analyze the status information and generate control information for use by the BMC in controlling the enclosure. The BMC 108 may further operate to receive or retrieve the control information from the host device 102. The BMC 108 may the utilize the control information from the host device 102 to control components of the enclosure which may include one or more of the switch 106, the DSDs 110-116, the fan 130, the temperature sensor 132 and the CPLD 134. The communication between the host device 102 and the BMC 108 may utilize various formats and may be protocol independent. For example, in some implementations, the status and control data may be formatted using SCSI Enclosure Services (SES) message format within PCIe communications.

The logic of each of the host device 102, the BMC 108 and the DSDs 110-116 may be implemented as hardware, software, firmware or some combination thereof. For example, the host device 102 may include an operating system and other software or drivers executed by one or more processors or controllers of the host device 102. The BMC 108 may include firmware instructions executed by processors or specialized circuitry of the BMC.

Figure 2:
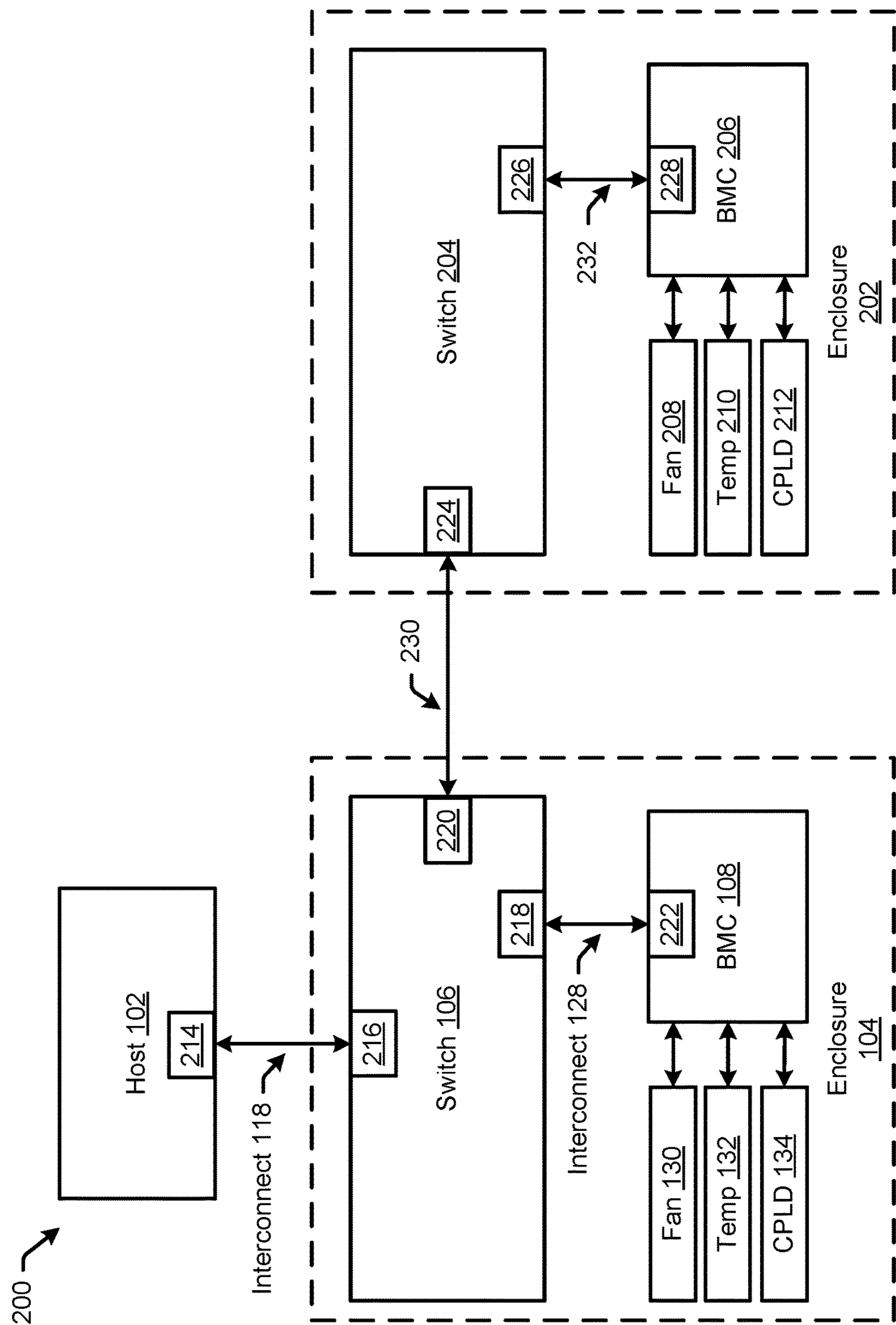
FIG. 2 is an illustration of the system of FIG. 1 in which another enclosure is hot plugged to the PCIe network topology, in accordance with certain embodiments of the present disclosure.

FIG. 2 provides an illustration of the example system from FIG. 1 in which another enclosure is hot plugged to the PCIe network topology through which the PCIe host device communicates with endpoint data storage devices of the enclosure and which is generally designated 200. More particularly, in the example system 200 illustrated in FIG. 2, an additional enclosure 202 is connected to the switch 106 of the enclosure 104, for example, during on-going operations of the host device 102 and the enclosure 104. The enclosure 202 may include a switch 204, a baseboard management controller 206, data storage devices (DSDs) (not shown), a fan 208, a temperature sensor 210 and a complex programmable logic device (CPLD) 212.

The components of enclosure 202 operate in a similar manner to the components of enclosure 104 and description of such similar operations will not be repeated for sake of brevity. Further, the DSDs of the enclosure are not shown for ease of illustration.

FIG. 2 illustrates PCIe ports 214-228 which act as connection points for interconnects 118, 128, 230, and 232. Specifically, the host device 102 may be coupled to the enclosure 104 by interconnect 118 via port 214 of the host device 102 and port 216 of the switch 106. Switch 106 may be coupled to the BMC 108 by interconnect 128 via port 218 of the switch 106 and port 222 of the BMC 108. The enclosure 104 may be coupled to the enclosure 202 by interconnect 230 via port 220 of the switch 106 and port 224 of the switch 204. Switch 204 may be coupled to the BMC 206 by interconnect 232 via port 226 of the switch 204 and port 228 of the BMC 206.

As mentioned above, the enclosure 202 may be hot plugged to the enclosure 104 during operation of the system 200. In some examples, the switch 106 may detect the establishment of a connection at port 220 and issue an enumeration interrupt to the host device 102. In response, the host device 102 may perform an enumeration of the PCIe topology during which the switch 204, the BMC 206 and other PCIe devices of the enclosure 202 (e.g. DSDs) may be added to the PCIe topology of the host device 102. Following the enumeration, the switch 204, the BMC 206 and other PCIe devices of the enclosure 202 and their related functionality may become active without significant interruption to the operation of the system.

Figure 3:
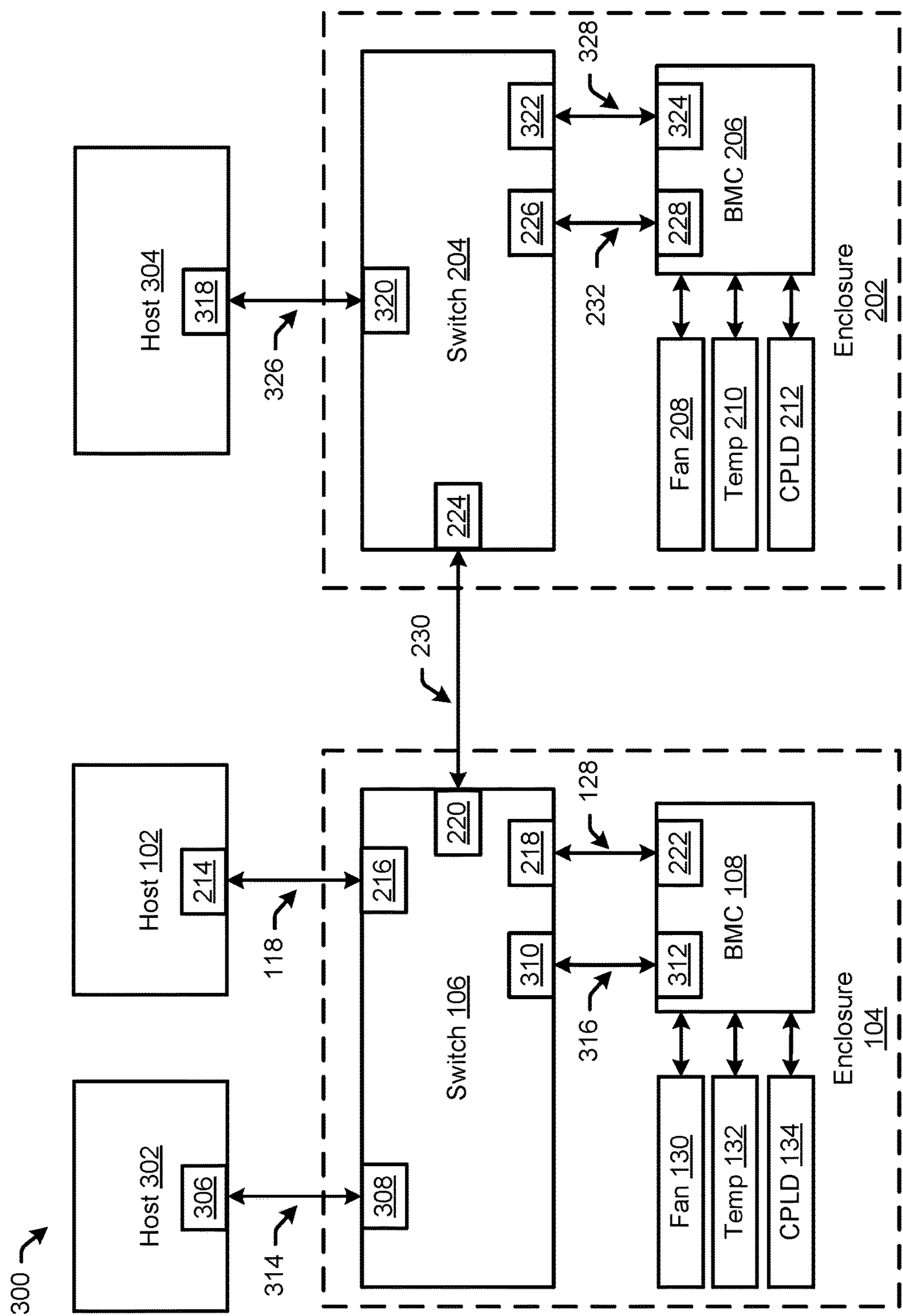
FIG. 3 is an illustration of the system of FIG. 2 in which additional hosts are coupled to the enclosures and the switches and BMCs of the enclosures operate to provide virtualized enclosures for each host, in accordance with certain embodiments of the present disclosure.

FIG. 3 provides an illustration of the example system from FIG. 2 in which additional hosts are coupled to the enclosures and the switches and BMCs of the enclosures operate to provide virtualized enclosures for each host and which is generally designated 300. In particular, FIG. 3 includes two additional hosts 302 and 304. In the example illustrated in FIG. 3, host device 302 is coupled to the enclosure 104 by an interconnect 314 via ports 306 and 308 and host device 304 is coupled to enclosure 202 by an interconnect 326 via ports 318 and 320.

In addition, each of the BMCs 108 and 206 includes an additional PCIe port which is coupled to the switches 106 and 204, respectively, by an additional PCIe interconnect. In particular, switch 106 may be coupled to the BMC 108 by the interconnect 316 via port 310 of the switch 106 and port 312 of the BMC 108. Similarly, switch 204 may be coupled to the BMC 206 by interconnect 328 via port 322 of the switch 204 and port 324 of the BMC 206.

In operation, the BMCs and switches may virtualize the enclosures to each respective host such that each host is given control over and status information from those resources that are assigned or allocated toit. In some examples, an administrator may give additional visibility or control to one or more host devices. DSDs of the enclosure may be automatically assigned between the hosts or an administrator may specify allocation as configuration information. In some cases, the addition of a host device or a change in the allocation of enclosure resources may indicate a resource in a host device's PCIe topology should be removed. In such a case, the BMC or the switch may issue an enumeration interrupt and hide the removed resource from the host device during the enumeration. Additional discussion of the allocation of enclosure components between host devices is provided below.

In the illustrated example, switch 106 and BMC 108 may virtualize enclosure 104 between hosts 102 and 302. Similarly, switch 204 and BMC 206 may virtualize enclosure 202 between hosts 102 and 304.

In some examples, the switches and BMCs may partially accomplish the virtualization by selectively responding during enumeration. For example, when host device 102 initializes the enumeration operation, the BMC 108 may cause the switch 106 to selectively forward the enumeration operation the DSDs of the enclosure 104 which are to be assigned to the host device 102. The BMC 108 may respond to the enumeration from host device 102 selectively by not providing enumeration of the PCIe port 312 and interconnect 316. In addition, the BMC 108 may provide visibility to host device 102 of status information and accept control updates for the portion of the enclosure 104 assigned to host device 102. A similar process may be performed for the enumeration operation of host device 302 for other portions of the enclosure 104. For example, the BMC 108 may selectively respond such that the PCIe port 312 and interconnect 316 are enumerated to host device 302 but not PCIe port 222 and interconnect 128. In this way, the switch 106 and BMC 108 may operate as part of multiple PCIe topologies which each correspond to a virtualized enclosure. Similar operations may be performed by the components of enclosure 202 for the enumeration and enclosure management operations of host devices 102 and 304. Although this example illustrates two host devices per enclosure and two PCIe ports on the BMCs, this is merely an example and any number of host devices per enclosure and PCIe ports on the BMCs may be utilized. Further, in some implementations, the PCIe ports of the BMCs may be connected to the corresponding switch by default or at all times. In such examples, the BMCs may respond to enumerations by giving each host device an enumeration response for a single PCIe port of the BMC and hiding other ports of the BMC.

As alluded to above, the allocation of enclosure resources between host devices may be performed in various ways. In some examples, the allocation may be performed by a first host device before or after a second or subsequent host device is connected to the enclosure. In other examples, an administrator may connect to the enclosure via another interface (e.g. an Ethernet connection) and configure the switch and BMC via that interface. In some other examples, the BMC may be configured by an administrator or host device and the BMC may subsequently control or instruct the switch on the allocation of resources. In another example, the BMC or switch may automatically divide the resources (e.g. DSDs, fans, sensors) of the enclosure based on the number of hosts connected thereto. In such an example, the BMC may further automatically allocate the status information and enclosure management control based on the allocation of resources. For example, the BMC may allocate the status information of DSDs to the host device to which the DSDs are assigned. Further, the BMC may allocate visibility of temperature sensors and fan controls associated with the portion of the enclosure in which the assigned DSD reside. Status information or control updates which may affect the enclosure as a whole may be allocated to one host device or shared by the host devices. These and other variations would be apparent to one of ordinary skill in the art in view this disclosure.

Figure 4:
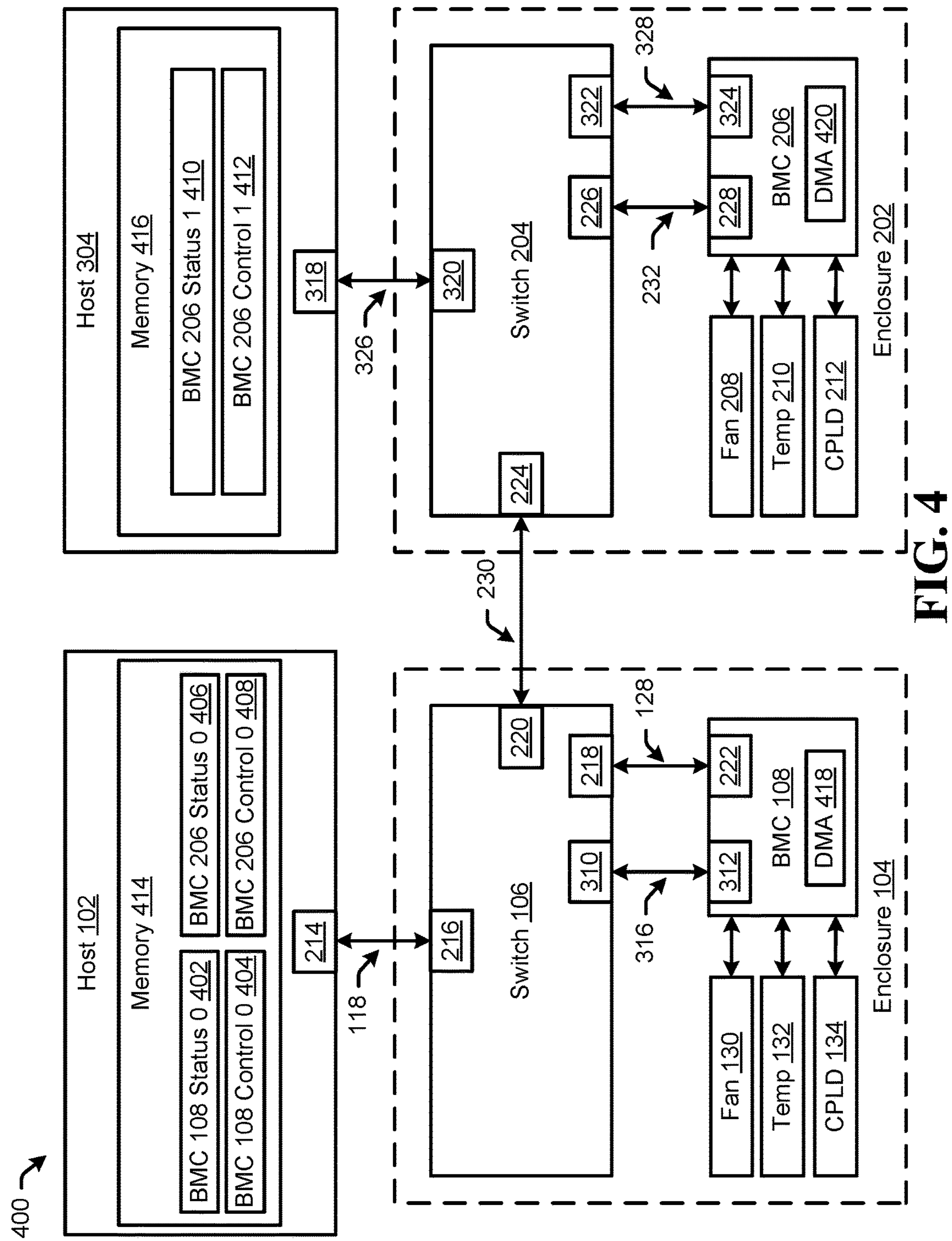
FIG. 4 is a block diagram of the system of FIG. 3 in which DMA operations a utilized for status information and control updates, in accordance with certain embodiments of the present disclosure.

FIG. 4 provides an illustration of the example system from FIG. 3 in which DMA operations may be utilized for status information and control updates and which is generally designated 400. As illustrated, the host devices 102 and 304 may include respective memories 414 and 416 in which memory locations are allocated for each enclosure associated with the respective host. In particular, host device 102 is associated with both enclosures 104 and 202 and, as such, may include a status memory location 402 for BMC 108, a control memory location 404 for BMC 108 and a status memory location 406 for BMC 206, and a control memory location 408 for BMC 206. Host 304 is associated with enclosure 202 and, as such, may include a status memory location 410 for BMC 206 and a control memory location 412 for BMC 206.

Each of the BMCs 108 and 206 may include DMA logic 418 and 420. The DMA logic 418 and 420 may provide for a DMA command-status queue type enclosure management. In some embodiments, the host may use DMA command-status queue type enclosure management to queue up more than one status requests in its memory resident queues. The BMC DMA logic may then read these host memory resident queues to obtain status requests and write to status data to these host memory resident queues as response. Similarly on the control path, the host memory may queue multiple control requests in its memory resident queues which the BMC DMA logic may read. The BMC may use the read control requests to control enclosure components like fans, LEDs, CPLD, etc. For example, the DMA logic 418 may push status information to a queue stored a memory location 402 and read from a queue stored at memory location 404 using DMA operations over the PCIe topology of host device 102. Similarly, the DMA logic 420 may push status information to queues stored a memory locations 406 and 410 and read from queues stored at memory locations 408 and 412 using DMA operations over the PCIe topologies of hosts 102 and 304.

Figure 5:
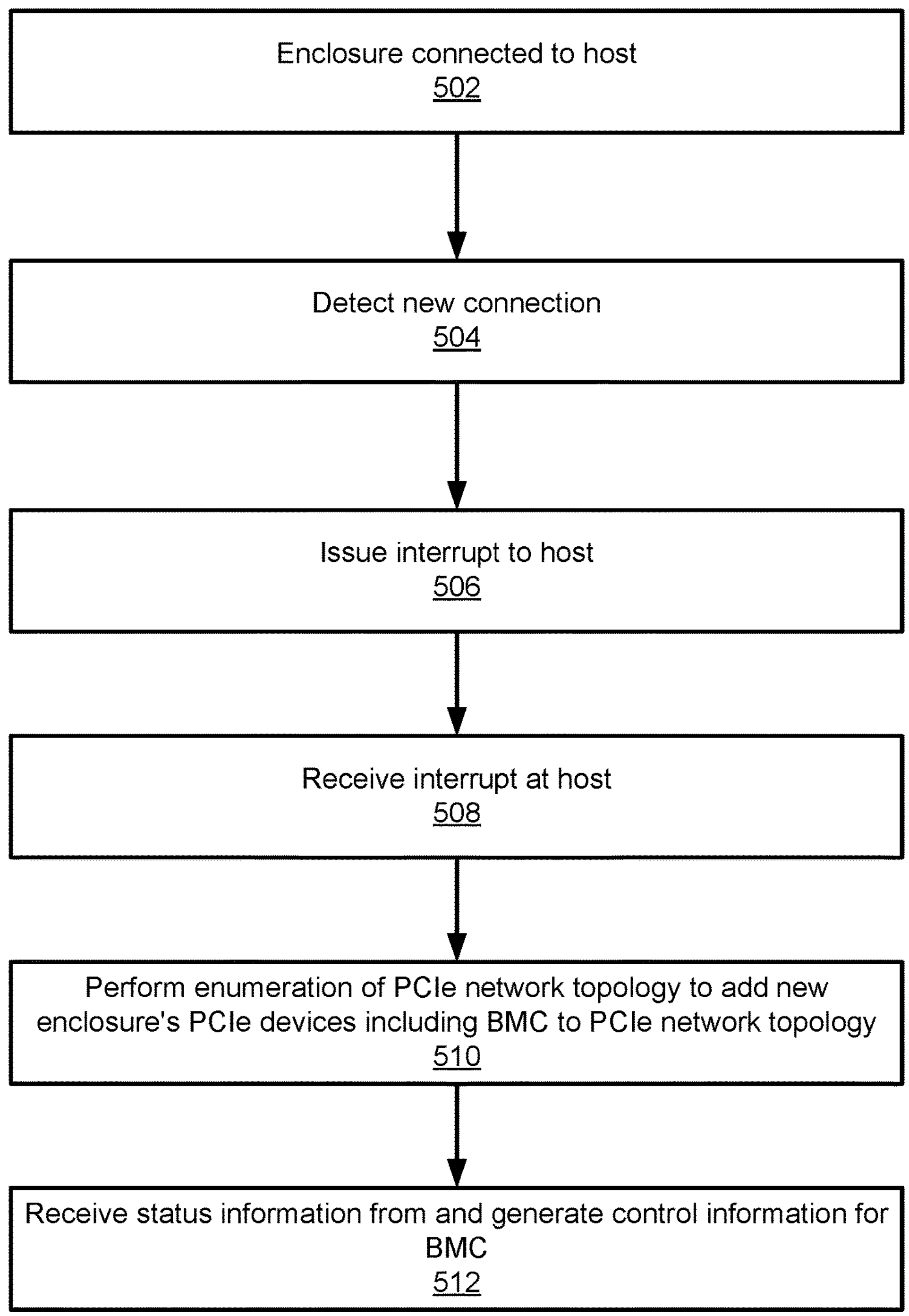
FIG. 5 is a flowchart of a method of enclosure management, in accordance with certain embodiments of the present disclosure.

Referring to FIG. 5, a flowchart of a method of enclosure management is shown and generally designated 500, in accordance with certain embodiments of the present disclosure. Specifically, FIG. 5 provides an example method of the operation of systems 100-400 to allow an enclosure to be hot plugged to the PCIe network topology through which a host device communicates with endpoint data storage devices of the enclosure.

At 502, an enclosure may be coupled to a PCIe port of the host device or the host device's PCIe network topology (e.g. to a PCIe port of the host device's root complex or to a PCIe port of a switch in the host device's PCIe network topology). At 504, the root complex or the switch may determine or detect that the enclosure has been connected to the host device. For example, the switch or root complex may detect an electrical connection has been established to a PCIe port that was previously unconnected. At 506, the switch or root complex may issue an interrupt to the host device to cause an enumeration operation to be performed. At 508, the host device may receive the interrupt. At 510, the host device may perform an enumeration of the PCIe network topology to add the new enclosure's PCIe devices (including the enclosure's BMC) to the PCIe network topology of the host device.

Subsequently, at 512, the host device may receive status information from and generate control information for the BMC.

In this manner, the enclosure management functionality of the enclosure may be activated by hot plugging without significant interruption to the operation of the system.

Figure 6:
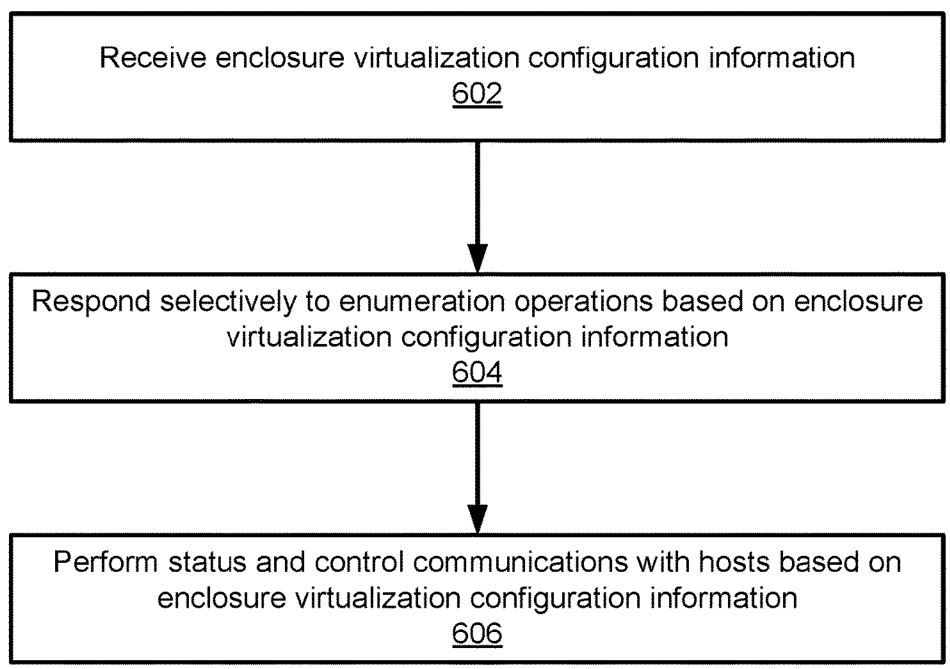
FIG. 6 is a flowchart of a method of enclosure management, in accordance with certain embodiments of the present disclosure.

Referring to FIG. 6, a flowchart of a method of enclosure management is shown and generally designated 600, in accordance with certain embodiments of the present disclosure. Specifically, FIG. 6 provides an example method of providing enclosure virtualization including virtualization of enclosure management control functionality.

At 602, the enclosure may receive virtualization configuration information. Depending on the embodiment, this information may be received by the BMC, the switch or both.

At 604, the enclosure components may respond selectively to enumeration operations from host devices based on the enclosure virtualization configuration information. For example, as discussed above with regard to FIG. 3, a BMC may respond to enumeration by providing the host device with a corresponding visible port connected to the enclosure switch while hiding other PCIe ports of the BMC connected to the enclosure switch. Further, the BMC may cause the enclosure switch to forward enumeration requests to the enclosure components which the configuration information allocates to the host device while blocking or intercepting enumeration operations for non-allocated resources. Then, at 606, the BMC of the enclosure may perform status and control communications with the host devices based on enclosure virtualization configuration information. For example, the BMC may provide temperature status information to a host for those DSD slots that are in the host's PCIe topology. Similarly, the BMC may let the host control those fans that the host is allowed to control by the configuration information. In some embodiments, fans and other controlled devices may not be PCIe endpoints.

Figure 7:
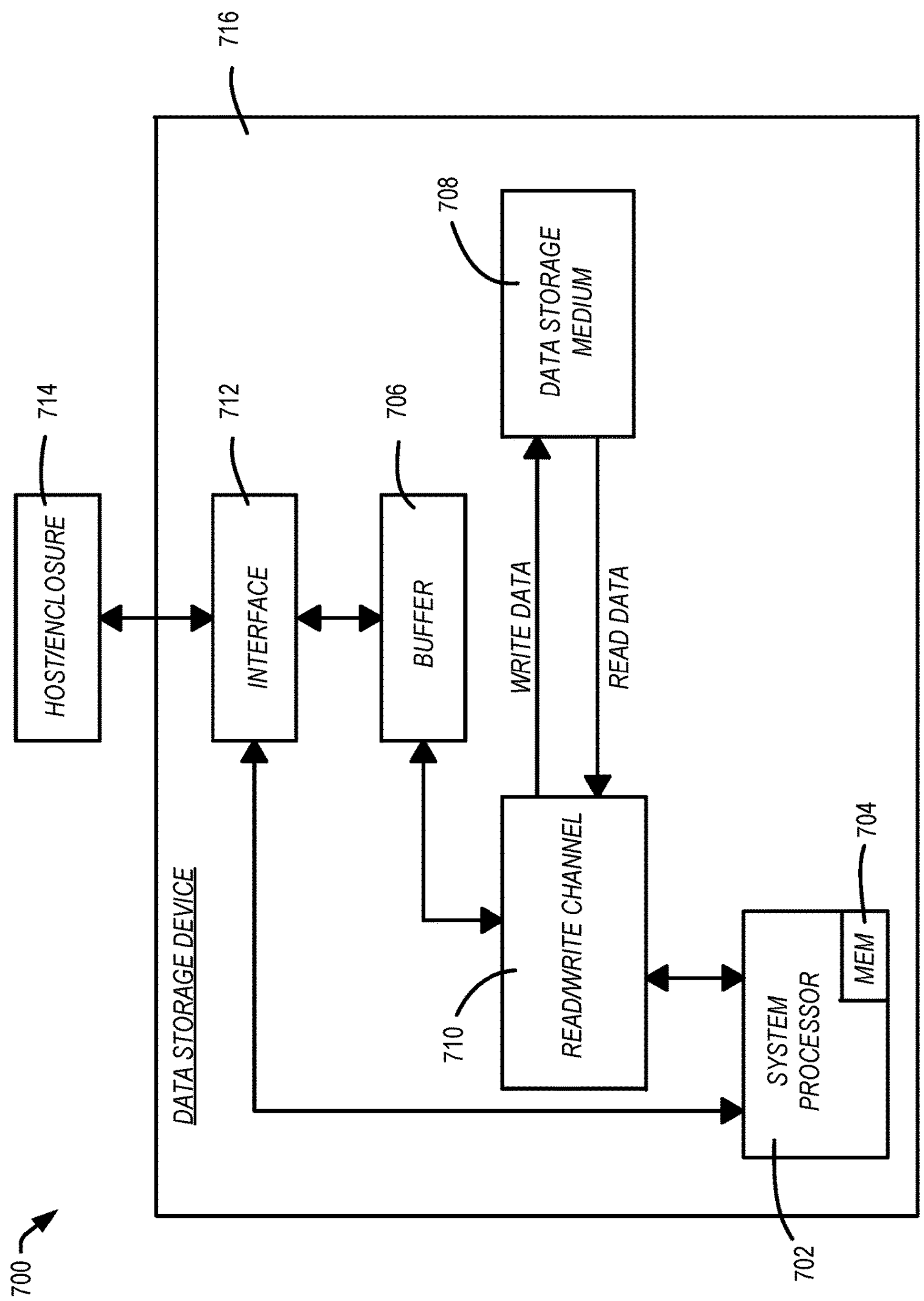
FIG. 7 is a block diagram of a system including enclosure management, in accordance with certain embodiments of the present disclosure.

Referring to FIG. 7, a block diagram of a data storage system including enclosure management is shown and generally designated 700. The system 700 can be an example of a data storage device (DSD), and may be an example implementation of systems 100-400. The DSD 716 can optionally connect to and be removable from a host device 714, which can be a device or system having stored data, such as a desktop computer, a laptop computer, a server, a digital video recorder, a photocopier, a telephone, a music player, other electronic devices or systems not listed, or any combination thereof. The data storage device 716 can communicate with the host device/enclosure 714 via the hardware/firmware based host interface circuit 712 that may include a connector (not shown) that allows the DSD 716 to be physically connected and disconnected from the host 714 (e.g. via a PCIe network including an enclosure switch and BMC).

The DSD 716 can include a system processor 702, which may be a programmable controller, and associated memory 704. The system processor 702 may be part of a system on chip (SOC). A buffer 706 may temporarily store data during read and write operations and can include a command queue. The read/write (R/W) channel 710 can encode data during write operations to, and reconstruct data during read operations from, the data storage medium 708. The data storage medium 708 is shown and described as a hard disc drive, but may be other types of medium, such as a flash medium, optical medium, or other medium, or any combination thereof.

The R/W channel 710 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 710 can combine multiple inputs and provide a single output.

Many variations would be apparent in view of this disclosure. For example, the discussion above refers to host devices. However, in some implementations, the functionality discussed with regard to the host device may be performed by a non-host device upstream PCIe root device. In addition, while the examples shown in FIGS. 1-6 include baseboard management controllers, this is not limiting and implementations may include any other type of enclosure management controller performing similar functions. Further, many of the features discussed herein may not be included in all implementations.

While the above description includes some embodiments that describe data storage device implementations, the present disclosure can be applied to any system that needs to transfer data between storage devices. For example, the present disclosure can be utilized in a host computer with multiple data storage devices or in a data center rack.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising a baseboard management controller (BMC) configured to:
- monitor one or more statuses of a storage array enclosure of the BMC;
- communicate with a host device of a PCIe network topology via a PCIe port of the BMC including:
  - performing a direct memory access (DMA) write to store status information of the enclosure to a memory of the host device via the PCIe network topology;
  - performing a DMA read to retrieve control information from the memory of the host device via the PCIe network topology; and
- control one or more devices of the storage array enclosure based on the retrieved control information.

2. The apparatus of claim 1, further comprising a PCIe switch of the storage array enclosure, the PCIe port of the BMC being a first PCIe port of the BMC connected to a first switch PCIe port of the PCIe switch by a first PCIe interconnect and the PCIe switch including a second switch PCIe port of the PCIe switch coupled to a host PCIe port of the host device via at least one second PCIe interconnect.

3. The apparatus of claim 2, further comprising the BMC including a second PCIe port of the BMC connected to a third switch PCIe port of the PCIe switch by a third PCIe interconnect.

4. The apparatus of claim 3, further comprising the first PCIe port of the BMC being included in the PCIe network topology and the second PCIe port of the BMC being absent from the PCIe network topology.

5. The apparatus of claim 3, further comprising the BMC further configured to:
communicate with a second host device of a second PCIe network topology via the second PCIe port of the BMC; and
the second PCIe port of the BMC being included in the second PCIe network topology and the first PCIe port of the BMC being absent from the second PCIe network topology.

6. The apparatus of claim 5, further comprising at least one of the PCIe switch and the BMC being configured to:
receive enclosure virtualization configuration information indicating an enclosure resource is to be included in the first PCIe topology; and
the direct memory access (DMA) write storing status information of the enclosure resource to the memory of the host device based on the enclosure virtualization configuration information.

7. The apparatus of claim 5, further comprising the PCIe switch including a fourth switch PCIe port of the PCIe switch coupled to the second host device via a second PCIe switch of a second storage array and the second PCIe network topology including at least one storage device of the second storage array.

8. The apparatus of claim 6, further comprising the BMC being configured to:
based on the enclosure virtualization configuration information, cause first responses to a first enumeration operation from the host device to allow the first enumeration operation to include the enclosure resource in the first PCIe topology; and
based on the enclosure virtualization configuration information, cause second responses to a second enumeration operation from the second host device to prevent the second enumeration operation from including the enclosure resource in the second PCIe topology.

9. The apparatus of claim 6, further comprising the DMA read retrieving control information related to the enclosure resource.

10. An apparatus comprising:
a baseboard management controller (BMC) configured to:
monitor one or more statuses of a storage array enclosure of the BMC;
communicate with a first host device of a first PCIe network topology via a first PCIe port of the BMC including:
sending first status information of one or more first storage devices of the storage array enclosure that are part of the first PCIe network topology to the first host device via the first PCIe network topology; and
communicate with a second host device of a second PCIe network topology via a second PCIe port of the BMC including:
sending second status information of one or more second storage devices of the storage array enclosure that are part of the second PCIe network topology to the second host device via the second PCIe network topology.

11. The apparatus of claim 10, further comprising the BMC further configured to:
communicate with the first host device of the first PCIe network topology via the first PCIe port of the BMC including:
retrieving first control information for the one or more first storage devices from the first host device via the first PCIe network topology; and
communicate with the second host device of the second PCIe network topology via the second PCIe port of the BMC including:
retrieving second control information for the one or more second storage devices from the second host device via the second PCIe network topology.

12. The apparatus of claim 10, further comprising the first PCIe port of the BMC being included in the PCIe network topology and the second PCIe port of the BMC being absent from the PCIe network topology.

13. The apparatus of claim 10, further comprising the sending of the first status information comprising a direct memory access (DMA) write to a memory of the first host device.

14. The apparatus of claim 11, further comprising the first control information indicating that a particular storage device of the one or more first storage devices should be powered off.

15. The apparatus of claim 11, further comprising a PCIe switch of the storage array enclosure, the first PCIe port of the BMC being connected to a first switch PCIe port of the PCIe switch by a first PCIe interconnect and the PCIe switch including a second switch PCIe port of the PCIe switch coupled to a host PCIe port of the host device via at least one second PCIe interconnect.

16. The apparatus of claim 15, further comprising the second PCIe port of the BMC connected to a third switch PCIe port of the PCIe switch by a third PCIe interconnect.

17. An apparatus comprising:
a baseboard management controller (BMC) configured to:
receive enclosure virtualization configuration information indicating:
one or more first storage devices of a storage array enclosure that are to be part of a first PCIe network topology of a first host device; and
one or more second storage devices of the storage array enclosure are to be part of a second PCIe network topology of a second host device;
based on the enclosure virtualization configuration information, cause one or more first responses to a first enumeration operation from the first host device to allow the first enumeration operation to include the one or more first storage devices in the first PCIe topology; and
based on the enclosure virtualization configuration information, cause one or more second responses to a second enumeration operation from the second host device to prevent the second enumeration operation from including the one or more first storage devices in the second PCIe topology.

18. The apparatus of claim 17, further comprising:
a PCIe switch of the storage array enclosure, a first PCIe port of the BMC connected to a first switch PCIe port of the PCIe switch by a first PCIe interconnect and the PCIe switch including a second switch PCIe port of the PCIe switch coupled to a host PCIe port of the first host device via at least one second PCIe interconnect; and
the BMC including a second PCIe port of the BMC connected to a third switch PCIe port of the PCIe switch by a third PCIe interconnect.

19. The apparatus of claim 17, further comprising the BMC configured to:

communicate with the first host device of the first PCIe network topology via a first PCIe port of the BMC including:

sending first status information of one or more first storage devices of the storage array enclosure that are part of the first PCIe network topology to the first host device via the first PCIe network topology; and communicate with the second host device of the second PCIe network topology via a second PCIe port of the BMC including:

sending second status information of one or more second storage devices of the storage array enclosure that are part of the second PCIe network topology to the second host device via the second PCIe network topology.

20. The apparatus of claim 19, further comprising the sending of the first status information comprising a direct memory access (DMA) write to a memory of the first host device.

* * * * *